US012768798B2

(12) United States Patent
Ng et al.

(10) Patent No.: US 12,768,798 B2
(45) Date of Patent: Oct. 20, 2026

(54) POLARIZED IMAGING REFLECTOMETER

(71) Applicant: Applied Materials, Inc., Santa Clara, CA (US)

(72) Inventors: Eric Chin Hong Ng, Livermore, CA (US); Todd Egan, Fremont, CA (US); Mehdi Vaez-Iravani, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 208 days.

(21) Appl. No.: 18/731,195

(22) Filed: May 31, 2024

(65) Prior Publication Data

US 2025/0369897 A1 Dec. 4, 2025

(51) Int. Cl.
*G01N 21/95* (2006.01)
*G01N 21/33* (2006.01)

(52) U.S. Cl.
CPC ......... *G01N 21/9501* (2013.01); *G01N 21/33* (2013.01); *G01N 2201/0636* (2013.01)

(58) Field of Classification Search
CPC ............... G01N 21/9501; G01N 21/33; G01N 2201/0636
See application file for complete search history.

(56) References Cited

U.S. PATENT DOCUMENTS 5,486,701 A * 1/1996 Norton .................. G01N 21/55 250/372
6,184,984 B1 * 2/2001 Lee ......................... G01J 3/447 356/369
2004/0150820 A1 * 8/2004 Nikoonahad ...... G01N 21/9501 250/372
2007/0100580 A1 * 5/2007 Marcus ............. G01B 11/0683 702/170
2010/0219327 A1 * 9/2010 Arbore .................. G01N 21/55 250/206
2012/0089365 A1 * 4/2012 Fay ...................... G01B 9/0209 703/2
2013/0039460 A1 2/2013 Levy et al.
(Continued)

OTHER PUBLICATIONS

International Search Report and Written Opinion from PCT/US2025/027106 dated Aug. 25, 2025, 11 pgs.

*Primary Examiner* — Hugh Maupin
(74) *Attorney, Agent, or Firm* — Schwabe, Williamson & Wyatt, P.C.

(57) ABSTRACT

Embodiments described herein relate to an apparatus that includes a light engine with a plurality of light sources. In an embodiment, each of the plurality of light sources is configured to emit a spectral band with different wavelength bandwidth. The apparatus may also include a beam splitter that is optically coupled to the light engine, where the beam splitter splits the spectral bands into a first optical path and a second optical path. In an embodiment, a power monitor is optically coupled to the beam splitter along the first optical path, and a reflective objective lens is optically coupled to the beam splitter along the second optical path. In an embodiment, the reflective objective lens includes a first mirror and a second mirror. In an embodiment, the apparatus further includes an optical sensor configured to measure the spectral bands after the spectral bands have reflected off of a substrate.

17 Claims, 10 Drawing Sheets

(56) References Cited

U.S. PATENT DOCUMENTS

2013/0044300 A1* 2/2013 Mei .......................... G03F 9/7088
355/52
2013/0321810 A1* 12/2013 Wang .................. G03F 7/70625
356/369
2016/0161245 A1 6/2016 Fu et al.
2019/0107384 A1 4/2019 Ygartua et al.
2020/0240907 A1 7/2020 Wang et al.
2022/0196576 A1* 6/2022 Wang .................. G01N 23/201
2022/0349813 A1 11/2022 Imai et al.
2023/0350308 A1* 11/2023 Pawlowski ............... G03F 1/84

* cited by examiner

POLARIZED IMAGING REFLECTOMETER

BACKGROUND

1) Field

Embodiments of the present disclosure pertain to metrology that is performed with a polarized imaging reflectometer.

2) Description of Related Art

Reflectometry is commonly used for semiconductor process control in thin-film analysis. For example, reflectometry can be used for measuring a thickness of a layer, a refractive index of the material, a surface roughness, or the like. In some instances a coupled-wave analysis model can also be deployed to solve the un-polarized/polarized reflected signal (i.e., scattering) from a structure with periodic variations in the layer geometry. For example, the periodic variations may include fin structures, hole arrays, trenches, diffraction gratings, photonic crystals, and/or the like. Detailed profile information of the periodic structures (e.g., trench depth, critical dimension (CD), etc.) can be inferred by comparing the calculated model reflectance against the measured reflectance. This provides a high-throughput and non-destructive metrology solution as an alternative to cross-sectioning and scanning electron microscopy (SEM) imaging.

Typically, reflectometry includes a broadband light source that is emitted towards a sample. The sample reflects the incident light, and a spectrometer array captures the reflected light to separate and measure spectral components of the reflected signal. The shorter wavelengths of the incident light (e.g., in the ultraviolet (UV) range) provide higher sensitivity in detecting slight variations in thickness, and the longer wavelengths tend to penetrate deeper into thicker structures for precise measurement.

SUMMARY

Embodiments described herein relate to an apparatus that includes a light engine, where the light engine includes a plurality of light sources. In an embodiment, each of the plurality of light sources is configured to emit a spectral band with different wavelength bandwidth. The apparatus may also include a beam splitter that is optically coupled to the light engine, where the beam splitter splits the spectral bands into a first optical path and a second optical path. In an embodiment, a power monitor is optically coupled to the beam splitter along the first optical path, and a reflective objective lens is optically coupled to the beam splitter along the second optical path. In an embodiment, the reflective objective lens includes a first mirror and a second mirror. In an embodiment, the apparatus further includes an optical sensor configured to measure the spectral bands after the spectral bands have reflected off of a substrate.

Embodiments described herein relate to an apparatus that includes a chamber, where a wall of the chamber includes a window. In an embodiment, a stage is within the chamber, and an imaging reflectometer is outside of the chamber. In an embodiment, the imaging reflectometer includes a light engine with a plurality of light sources, where each light source emits a spectral band with a different wavelength bandwidth. The imaging reflectometer may include a reflective objective lens optically coupled to the light engine and positioned over the window, and the reflective objective lens reflects the spectral bands through the window towards the stage. In an embodiment, an optical sensor is optically coupled to the reflective objective lens.

Embodiments described herein relate to a method that includes propagating a series of input beams into an optics system with a beam splitter, a reflective objective lens, a power monitor, and an optical sensor, where the optics system is outside of a chamber. In an embodiment, the method includes reflecting the series of input beams off of a substrate that is inside the chamber, and receiving the reflected series of input beams with the optical sensor to provide a plurality of monochromatic images of the substrate.

DETAILED DESCRIPTION

Figure 1A:
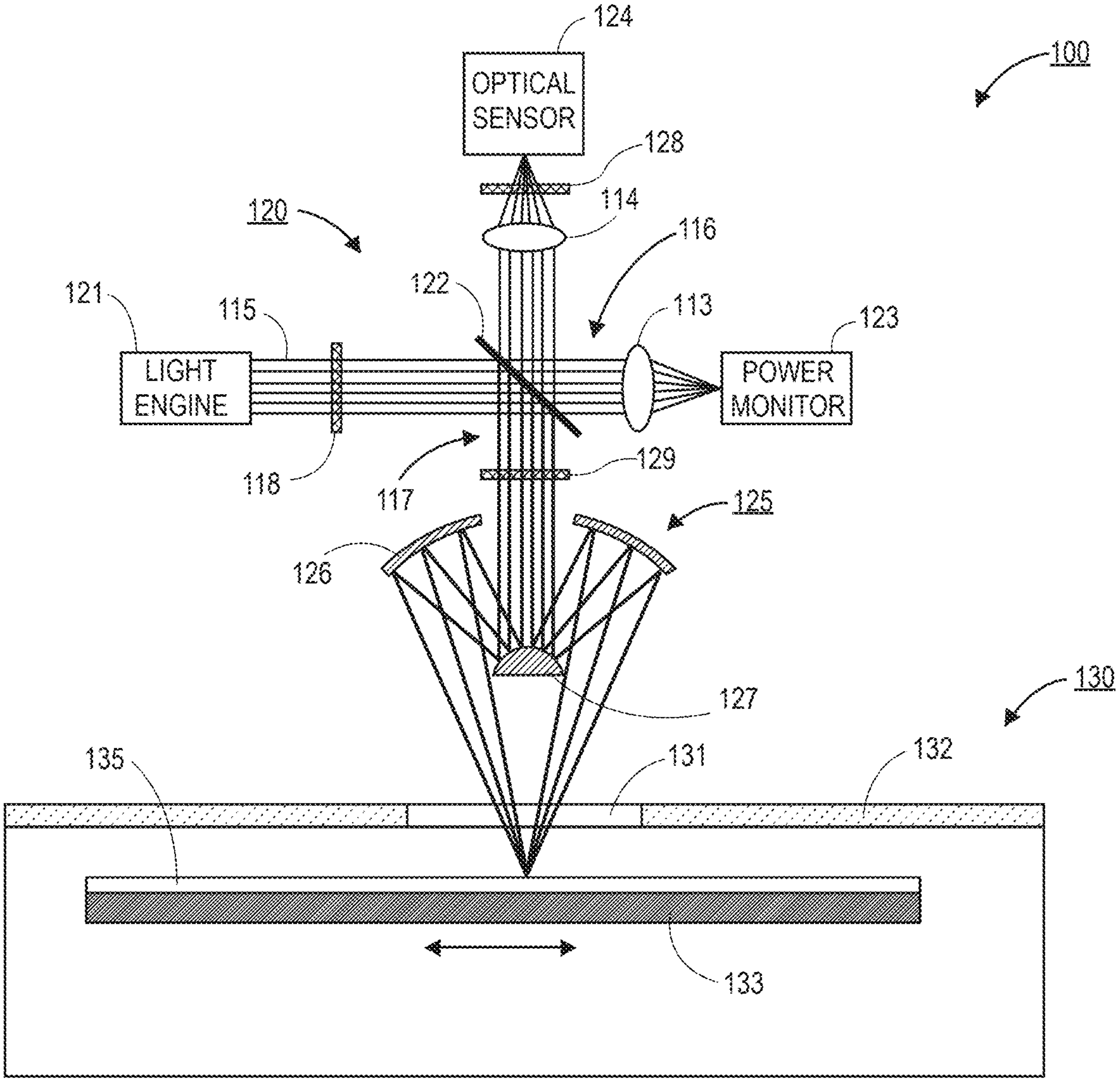
FIG. 1A is a cross-sectional illustration of an imaging reflectometer for providing in-line metrology of a substrate within a chamber, in accordance with an embodiment.

Polarized imaging reflectometers used for metrology purposes are disclosed herein, in accordance with various embodiments. In the following description, numerous specific details are set forth in order to provide a thorough understanding of embodiments. It will be apparent to one skilled in the art that embodiments may be practiced without these specific details. In other instances, well-known aspects are not described in detail in order to not unnecessarily obscure embodiments. Furthermore, it is to be understood that the various embodiments shown in the accompanying drawings are illustrative representations and are not necessarily drawn to scale.

Various embodiments or aspects of the disclosure are described herein. In some implementations, the different embodiments are practiced separately. However, embodiments are not limited to embodiments being practiced in isolation. For example, two or more different embodiments can be combined together in order to be practiced as a single device, process, structure, or the like. The entirety of various embodiments can be combined together in some instances. In other instances, portions of a first embodiment can be combined with portions of one or more different embodiments. For example, a portion of a first embodiment can be combined with a portion of a second embodiment, or a portion of a first embodiment can be combined with a portion of a second embodiment and a portion of a third embodiment.

The embodiments illustrated and discussed in relation to the figures included herein are provided for the purpose of explaining some of the basic principles of the disclosure. However, the scope of this disclosure covers all related, potential, and/or possible, embodiments, even those differing from the idealized and/or illustrative examples presented. This disclosure covers even those embodiments which incorporate and/or utilize modern, future, and/or as of the time of this writing unknown, components, devices, systems, etc., as replacements for the functionally equivalent, analogous, and/or similar, components, devices, systems, etc., used in the embodiments illustrated and/or discussed herein for the purpose of explanation, illustration, and example.

In some instances, imaging reflectometers can be used to provide spatial information in addition to the traditional way of analyzing reflectance, as described above. In such cases, each pixel constitutes a reflectance bit for a particular wavelength. Depending on the imaging resolution chosen or the depth of field designed, imaging reflectometry is often limited by the parfocality across the spectral wavelengths when refractive optics are used. Additionally, chromatic aberration limits reductions in measurement spot sizes and transports light in a wavelength-dependent fashion. Further, refractive optics are less likely to transmit efficiently for a broad spectrum (e.g., from 200 nm to 1700 nm). The camera's quantum efficiency may also limit the detection range. This makes the design of refractive optics with a broad range challenging. A camera that works in a similar range may also be difficult to obtain.

The replacement of cross-sectioning and SEM imaging with imaging reflectometry is also challenging for other reasons. For example, existing solutions require the substrate to be removed from the vacuum environment (e.g., before and/or after processing) in order to make the reflectometry measurements. This provides significant increases in the duration of the metrology, and can negatively impact throughput. Further, it may not be feasible to monitor every substrate with such an off-line metrology process due to time constraints. Removing the substrate from the vacuum environment also risks deteriorating material or surface properties on the substrate. That is, the measured properties may not accurately reflect the true state of the substrate after processing.

Accordingly, embodiments disclosed herein include an imaging reflectometry system that is configured to enable in-line metrology of substrates that are held in a chamber at sub-atmospheric pressures (e.g., within a vacuum chamber). In some embodiments, the chamber is coupled to a processing chamber so that the substrate does not need to leave a vacuum condition in order to be analyzed by the imaging reflectometry system. Therefore, potential damage and/or degradation of the materials and/or surface properties of the substrate is eliminated. Without the need to break the vacuum condition, the metrology can be implemented faster, and the production flow is not significantly impacted. Such a solution may allow for immediate feedback and adjustments. This ensures that the processed substrates meet the targeted specifications and/or can receive immediate correction if the targeted specifications are not met.

In an embodiment, the metrology chamber may also include a displaceable stage for supporting the substrate. For example, the stage may be displaceable in a plane that is substantially parallel to a window along a surface of the metrology chamber through which the electromagnetic radiation passes. Accordingly, multiple different locations along the surface of the substrate and/or a continuous measurement across a surface of the substrate can be measured with the imaging reflectometry system.

With the motion system for the stage within the vacuum environment of the metrology chamber, the optical window through the chamber can be made smaller. This decreases effects of warpage and/or pressure-induced phase change better compared to a larger optical window. As such, the accuracy of measurements (including polarized reflectance measurements) is improved. In some instances, a compensator, such as a quarter waveplate, may also be added into the optical path of the imaging reflectometry system to help mitigate any errors due to pressure-induced window retardance (e.g., spatially or timely at a change of pressure). When a compensator is used, the compensator may be a rotating compensator or a fixed compensator. The analyzer for the imaging reflectometry system may be fixed or rotating as well.

In an embodiment, the imaging reflectometry system may replace a broadband light source with a light engine that comprises a plurality of light sources that each emit a narrow spectral band with different wavelength bandwidths. In an embodiment, the plurality of light sources may include two or more light sources, three or more light sources, five or more light sources, or ten or more light sources. The spectral bands may be sequentially propagated into the imaging reflectometry system. A beam splitter may split the optical path in the imaging reflectometry system into a first optical path that is coupled to a power meter and a second optical path that is directed to a substrate with a metrology chamber. The power meter may monitor any fluctuation of the illuminating source (with or without a polarizer), and provide feedback to correct the input signal fluctuation.

The second optical path may include a reflective objective, such as a Schwarzschild reflective objective. The use of a reflective objective may allow for a more uniform spot size for the different spectral bands of the plurality of light sources. Additionally chromatic aberration is significantly reduced or completely eliminated. The light reflecting off of the substrate then passes back through the second optical path towards an optical sensor, such as a camera, to form an image at the camera. In an embodiment, the image comprises pixels of monochromatic reference bits imaged from the substrate's targeted field of view (FOV). The sequential illuminating of input beams may be synchronized to trigger the optical sensor for each image of corresponding narrow spectral bands.

In an embodiment, the sequential illumination of input beams at a fast switching rate (e.g., 1 ms to 100 ms) and the corresponding camera capture may be used to form a three-dimensional pixelated image of reflectance spectra from the imaged area of the substrate in the FOV. A monochromatic image contains spatial information about the region, and the third dimension (from the plurality of beams at different wavelengths) can be used to constitute spectra for each spatial pixel. In some instances, this allows for neighboring dies and devices of interest to be monitored, measured, and/or compared simultaneously within the FOV.

In an embodiment, the optics of the imaging reflectometry system may allow for a relatively large FOV. For example, the FOV may have a diameter of up to approximately 1.0 mm, or up to approximately 2.0 mm. Though, larger FOVs may also be possible in other embodiments. The term FOV described herein may refer to an image with a particular area. More generally, the FOV may include an image with a plurality of individual pixels. The large FOV allows for easier compensation of positional errors of the substrate. This reduces the demands of the precision of the motion system for the stage within the metrology chamber. Further, the reflective optics may have a high numerical aperture (e.g., from 0.15 to 0.4), which can be useful for resolving micrometer or sub-micrometer feature sizes on the substrate. This allows for metrology pads and/or fiducials to be reduced in size (e.g., to pad sizes and other dimensions that are less than 25 μm). As such, valuable area on the substrate can be saved for functional devices. Further, the improved resolution throughout the entire FOV allows for relatively large area regions of the substrate to be observed and analyzed (e.g., by a human operator, a computer aided imaging system, and/or the like). In some instances, the image (or images) obtained by the imaging system allow for specific areas (e.g. different features on the substrate, different materials at the surface of the substrate, and/or the like) to be analyzed in order to obtain a parameter of interest (e.g., yield, electrical test properties, reflective metrology values, and/or the like).

In some embodiments, continuous scanning and movement of the substrate enables quick navigation and inspection capability. During a navigation process, a single wavelength (or several wavelengths) may be used for simplicity. This allows for navigation to desired locations on the substrate without the need for an additional navigation camera. Though, in some embodiments, a navigation camera may also be used.

In an embodiment, one or more different measurement modes may be used by the imaging reflectometry system. For example, a polarizer may be provided at two or four position (e.g., TE/TM modes, or every $\pi/4$ relative to the plane of incidence). The polarizer may also be continuously rotated to collect more slices of Fourier components, similar to RAE ellipsometry, but with spatial imaging. Similar measurement modes may also be performed by rotating the compensator while keeping the analyzer fixed. In an embodiment, the measured data may be a reflectance value. The reflectance value may be unpolarized, TE polarized, TM polarized, and/or ellipsometry Psi-Delta values. The measured data may be inverse-fitted with a Fresnel model or an optical critical dimension (OCD) model to obtain parameters of interest, such as a thickness of a layer, refractive index (n), extinction coefficient (k), CDs of periodic structures, and/or the like. In an embodiment, the physical model can be used in hybrid with a machine-learning model, or the physical model may be entirely replaced by a machine-learning model.

Referring now to FIG. 1A, a cross-sectional illustration of a tool 100 is shown in accordance with an embodiment. In an embodiment, the tool 100 may be a metrology tool used for measuring one or more properties of a substrate 135 during a semiconductor manufacturing process flow. For example, the substrate may be a semiconductor substrate, such as a silicon wafer or the like.

The metrology performed by the tool 100 may be considered as being "in-line" metrology. That is, the substrate 135 may be measured without the substrate 135 needing to be removed from the manufacturing process flow. In a particular embodiment, the substrate 135 remains on a stage 133 within a metrology chamber 130. The metrology chamber 130 may be coupled to a processing chamber (not shown) so that the substrate 135 is transferrable between the metrology chamber 130 and the processing chamber without the need to break a vacuum. As such, damage and/or degradation to surfaces or materials of the substrate 135 resulting from removal from vacuum are mitigated or completely avoided. Further, keeping the substrate 135 within the vacuum reduces the time necessary to take metrology measurements.

In an embodiment, the metrology chamber 130 may comprise chamber walls 132 that surround the stage 133. In order to allow for optical metrology, such as reflectometry and/or ellipsometry, an optical window 131 is integrated into a portion of the chamber wall 132. In an embodiment, the optical window 131 is relatively small because the substrate 135 is on a stage 133 that is displaceable (as indicated by the arrows below the stage 133). In an embodiment, the stage 133 is displaceable in a plane that is substantially parallel to a surface of the optical window 131. In some embodiments, the stage 133 is displaceable in a single axis or in at least two axes. Other embodiments may include a stage 133 that is displaceable with an r–θ solution to allow both displacement in one axis and rotation. As such, the entire substrate 135 may be imaged within a compact metrology chamber 130.

Accordingly, a small optical window 131 can be used to image any portion of the substrate 135. In an embodiment, the small optical window 131 also mitigates warpage and/or pressure-induced phase change of the optical window 131, which provides improved accuracy. For example, the optical window 131 may have a width (e.g., a diameter) that is up to approximately 5 cm, up to approximately 1 cm, or up to approximately 50 mm. The small width also allows for a decrease in the thickness of the optical window 131 while still being able to support vacuum environments in the metrology chamber 130. For example, a thickness of the optical window 131 may be up to approximately 2 cm, up to approximately 1 cm, or up to approximately 50 mm. Though optical windows 131 with and width and/or thickness may also be used. Reducing the thickness of the optical window 131 may improve accuracy since spherical aberration is minimized through reducing the thickness of the optical window 131.

Further, while embodiments disclosed herein may include displacement of the substrate 135 while the imaging reflectometry system 120 is held stationary, other embodiments may include a displaceable imaging reflectometry system 120, Such an embodiment may simplify the design of the metrology chamber 130 since there may not be a need for a displaceable stage. However, both the imaging reflectometry system 120 and the stage 133 may be displaceable in some embodiments.

In an embodiment, the tool 100 may comprise an imaging reflectometry system 120 that is provided outside of the metrology chamber 130. In an embodiment, the imaging reflectometry system 120 may comprise a light engine 121 that is optically coupled to a beam splitter 122. In an embodiment, the light engine 121 may comprise a plurality of light sources, and each of the light sources may have different wavelength bands. For example, each wavelength band may be up to 60 nm (at full width half maximum (FWHM)). Though larger wavelength bands may also be used in some embodiments. A total range of wavelengths from the plurality of light sources may be relatively large, and the range may include ultraviolet (UV) to infrared (IR) wavelengths. For example, a total spectrum provided by the light engine 121 may range from approximately 200 nm to approximately 1800 nm.

In an embodiment, the light sources may comprise light emitting diodes (LEDs) and/or laser diodes (LDs). The light engine 121 may be configured to generate a plurality of input beams from each of the light sources. Further, the input beams 115 may be sequentially generated and propagated through the imaging reflectometry system 120. In an embodiment, a switching rate between the input beams 115 may be between approximately 1 ms and approximately 100 ms. Though, faster or slower switching rates may also be used in some embodiments. FIG. 1A is an example of an input beam 115 that is emitted by the light engine 121 that passes through the optics of the imaging reflectometry system 120 and is focused at a single point (i.e., a pixel) at the substrate 135. Though, as will be described in greater detail herein, the imaging reflectometry system 120 allows for a wide field of view (FOV).

In an embodiment, splitting the input beams 115 into sequential and different wavelength bands allows for greater control of the imaging reflectometry system 120. For example, each input beam 115 may have a power set to optimize performance. That is, not all input beams 115 have the same power. Additionally, the input beams 115 may have different durations in the sequential imaging process.

In an embodiment, the beam splitter 122 may split the input beam 115 into a first optical path 116 and a second optical path 117. The first optical path 116 is directed to a power monitor 123. One or more focusing lenses 113 may be provided along the first optical path 116 between the beam splitter 122 and the power monitor 123. The power monitor 123 may be a reference sensor, such as a photodiode, that is used to monitor uniformity and stability of the input beams 115 and/or to provide real time calibration of reflectance measurements made by the optical sensor 124. Measurements at the power monitor 123 may be used to adjust characteristics of the light sources (e.g., output power, etc.) to provide spatial and temporal corrections.

In an embodiment, the second optical path 116 passes to a reflective objective 125. In an embodiment, the reflective objective 125 is a Schwarzschild reflective objective 125. The use of a reflective objective 125 may allow for a more uniform spot size for the different spectral bands of the plurality of light sources of the light engine 121. Additionally chromatic aberration is significantly reduced or completely eliminated. As shown, the reflective objective 125 may comprise a primary mirror 126 and a secondary mirror 127. The primary mirror 126 may have an opening to allow the second optical path 116 to reach the secondary mirror 127. The secondary mirror 127 reflects the input beam 115 to the primary mirror 126, and the primary mirror 126 focuses the input beam 115 onto the substrate 135 (with the input beam 115 passing through the optical window 131).

In an embodiment, the secondary mirror 127 is relatively close to the stage 133 (and the substrate 135). For example, a distance between the secondary mirror 127 and the stage 133 may be up to 10 mm or up to 24 mm. Though, larger distances may also be used in some embodiments. In an embodiment, the reflective objective 125 may have a high numerical aperture (e.g., from 0.15 to 0.4), which can be useful for resolving micrometer or sub-micrometer feature sizes on the substrate. This allows for metrology pads and/or fiducials on the substrate 135 to be reduced in size (e.g., to pad sizes and other dimensions that are less than 25 μm).

In an embodiment, the input beam 115 is reflected off of the substrate 135 back towards the reflective objective 125 along the second optical path 117. The reflective input beam 115 passes through the beam splitter 122 again and continues toward an optical sensor 124. In an embodiment, one or more focusing lenses 114 may be provided between the beam splitter 122 and the optical sensor 124. In an embodiment, the optical sensor 124 may be an area imaging sensor that comprises one or more digital cameras for capturing light from the input beam 115 that is reflected from the substrate 135.

In an embodiment, the imaging reflectometry system 120 may also comprise one or more additional components for improving accuracy of the reflectance measurements. For example, a polarizer 118 may be provided between the light engine 121 and the beam splitter 122. The polarizer 118 may be a wire grid or the like. The polarizer may be rotatable to allow for TE mode, TM mode, and/or every π/4 relative to the plane of incidence. In other embodiments, the polarizer 118 may be continuously rotated to collect more slices of Fourier components (e.g., to allow for operation like RAE ellipsometry but with spatial imaging). In an embodiment, a compensator 129 may be provided between the reflective objective 125 and the beam splitter 122. The compensator 129 may be a quarter wave-plate in some embodiments. Additionally, an analyzer 128 may be provided between the beam splitter 122 and the optical sensor 128. The presence of a compensator 129 and the analyzer 128 may be used in order to provide ellipsometry measurements. In an embodiment, one or both of the compensator and the analyzer 128 may be rotatable as well.

In an embodiment, the data measured by the optical sensor 124 can be a reflectance measurement (e.g., in an unpolarized mode, a TE/TM mode, and/or ellipsometry Psi-Delta). The measured data may be inverse-fitted with a Fresnel mode or an OCD mode to obtain parameters of interest (e.g., thickness, n–k measurements, CDs of periodic structures, and/or the like). In an embodiment, the physical model can be used in hybrid with (or replaced by) a machine-learning model.

Figure 1B:
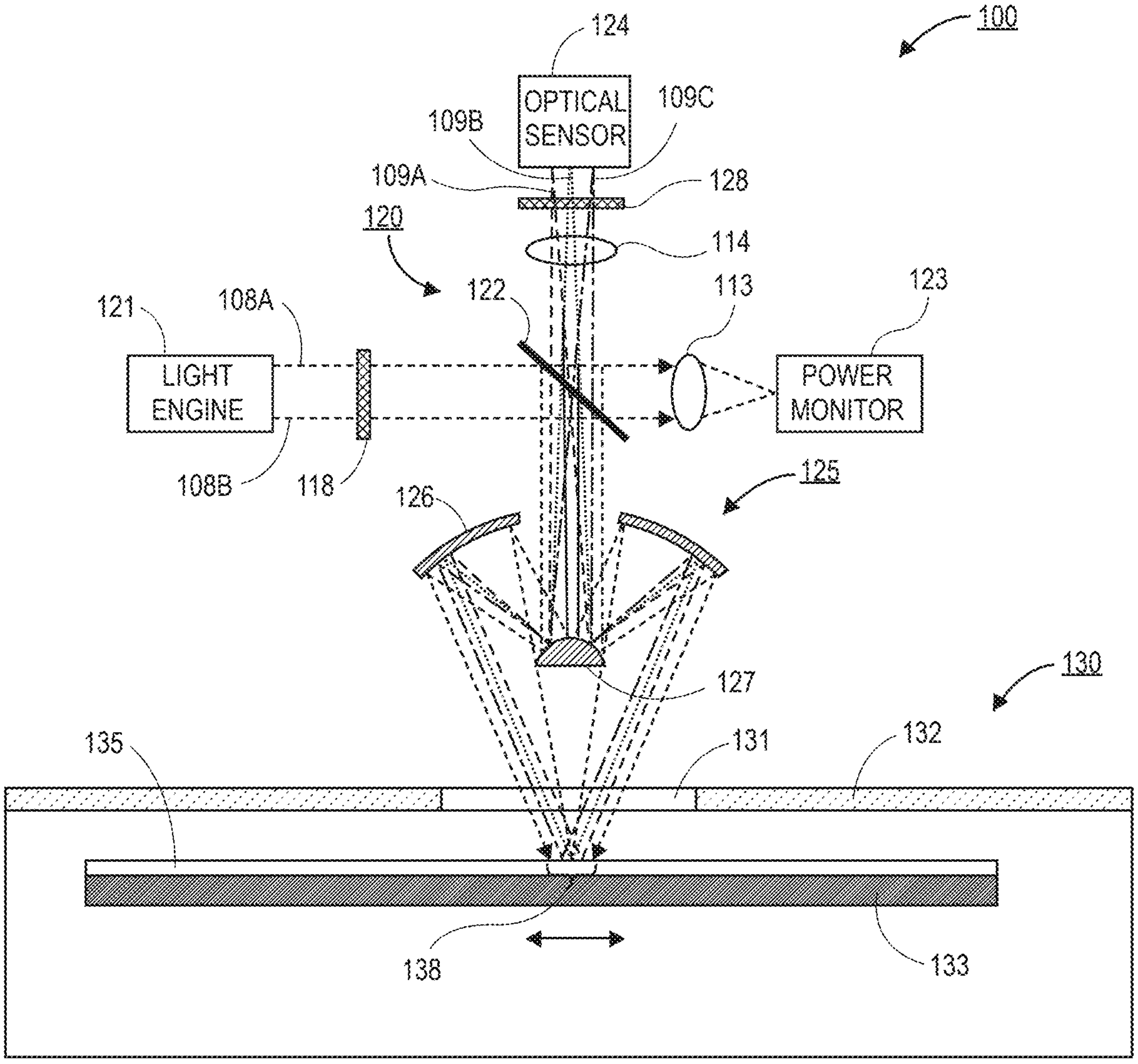
FIG. 1B is a cross-sectional illustration of an imaging reflectometer for providing in-line metrology that illustrates the field of view of the imaging reflectometer on the substrate, in accordance with an embodiment.

Referring now to FIG. 1B, a cross-sectional illustration of a tool 100 is shown, in accordance with an additional embodiment. The tool 100 in FIG. 1B may be substantially similar to the tool 100 in FIG. 1A. However, the imaging paths are drawn to more clearly illustrate the FOV and individual beam components within the FOV. For example, an illumination path 108 passes through the imaging reflectometry system 120 from the light engine 121 to the substrate 135. The illumination path 108 is shown with outer edges 108A and 108B. At the substrate 135, the illumination path 108 defines a FOV 138. The FOV 138 may be up to approximately 1 mm or up to approximately 2 mm. Though, larger FOVs 138 may also be provided in other embodiments. The light paths 109A-109C illustrate different spatial positions on the substrate 135 within the illumination path 108. For example, each light path 109A-109C may correspond to a pixel at the optical sensor 124.

Figure 1C:
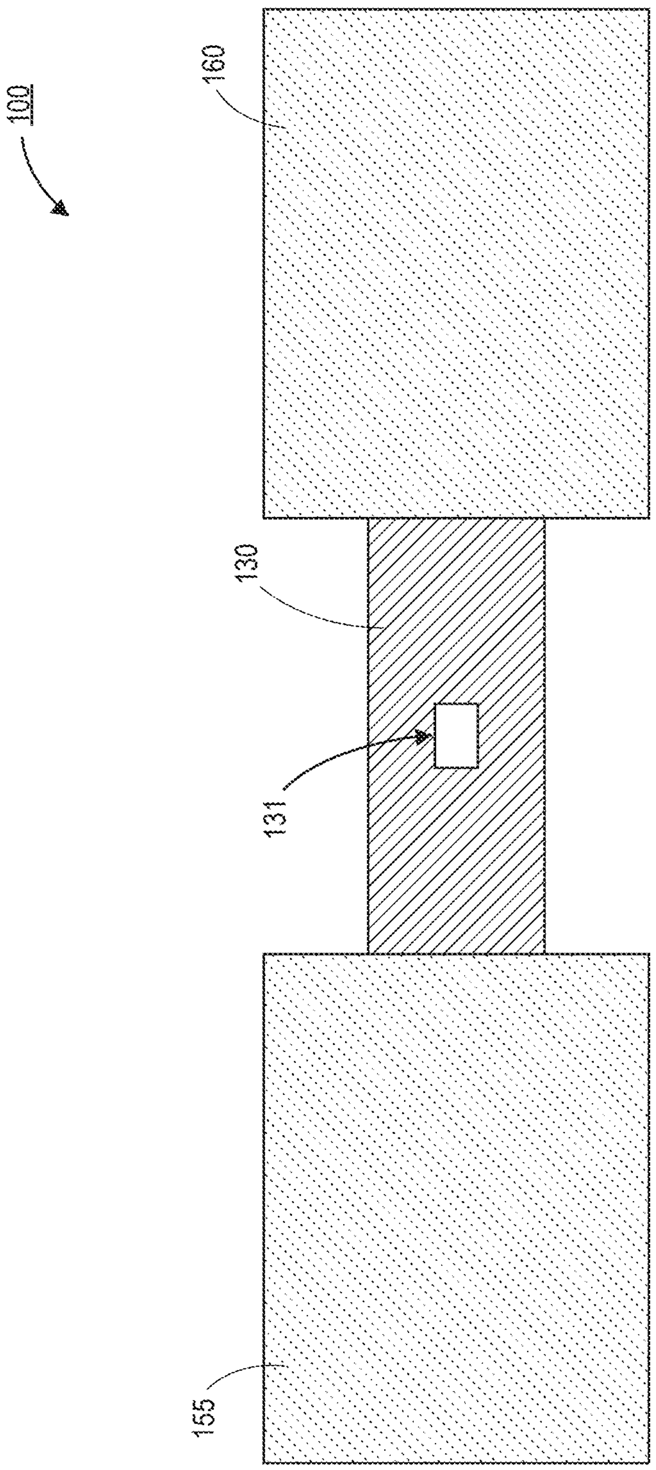
FIG. 1C is a plan view illustration of a processing tool that comprises a transfer chamber suitable for use with an in-line metrology imaging reflectometer, in accordance with an embodiment.

Referring now to FIG. 1C, a plan view illustration of a portion of a tool 100 is shown, in accordance with an embodiment. The tool 100 in FIG. 1C illustrates the various chambers, and the imaging reflectometry system is omitted for clarity. As shown, the metrology chamber 130 may be coupled to a processing chamber 160 (e.g., a deposition chamber, an etching chamber, a treatment chamber, or the like). The metrology chamber 130 may also be coupled to an additional chamber 155, such as a transfer chamber, a load lock, or the like. Accordingly, as a substrate (not shown) passes from the chamber 155 to the processing chamber 160, metrology can be performed on the substrate through imaging that passes through the optical window 131 in the metrology chamber 130. In a particular embodiment, the metrology can be implemented on the substrate before processing and after processing. This allows for easier determination of any changes that occur during the processing of the substrate (as will be described in greater detail below).

Figure 2A:
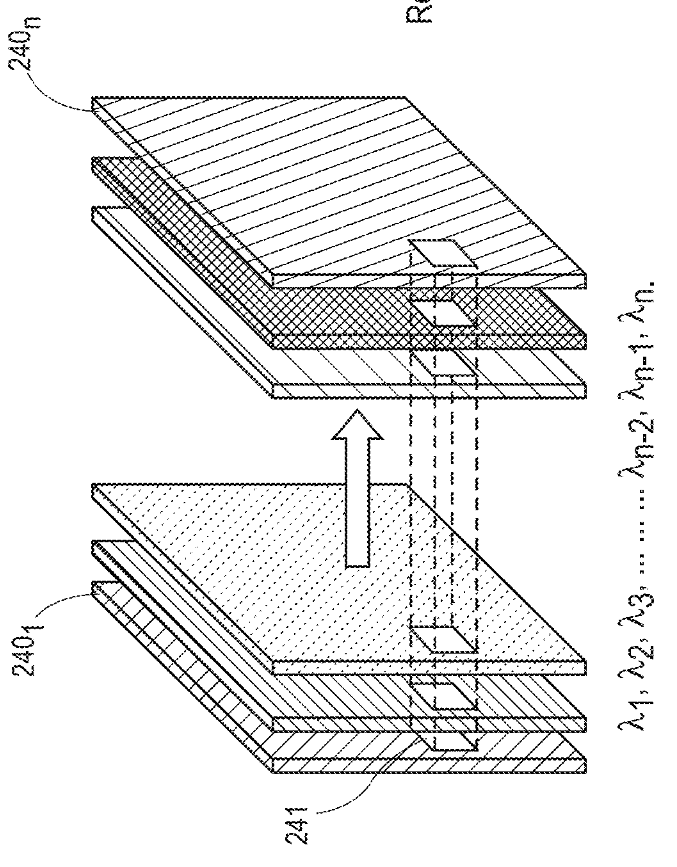
FIG. 2A is an illustration of monochromatic image slices detected by the optical sensor of an imaging reflectometer, in accordance with an embodiment.

Referring now to FIG. 2A, an illustration of different image slices $240_1$-$240_n$ that can be obtained is shown, in accordance with an embodiment. As noted above, the light engine may be configured to provide a sequence of input beams with different wavelengths. In an embodiment, the optical sensor is configured to be triggered at the same rate to capture the image slice 240 for each wavelength. This allows for the formation of a three-dimensional pixelated image of the reflectance spectra from the imaged area of the substrate. In an embodiment, each image slice 240 may comprise a plurality of pixels 241. Depending on the optics, the image slices $240_1$-$240_n$ may have any suitable number of pixels. For example, the image slices 240 may have 2048×2048 pixels in some embodiments.

Figure 2B:
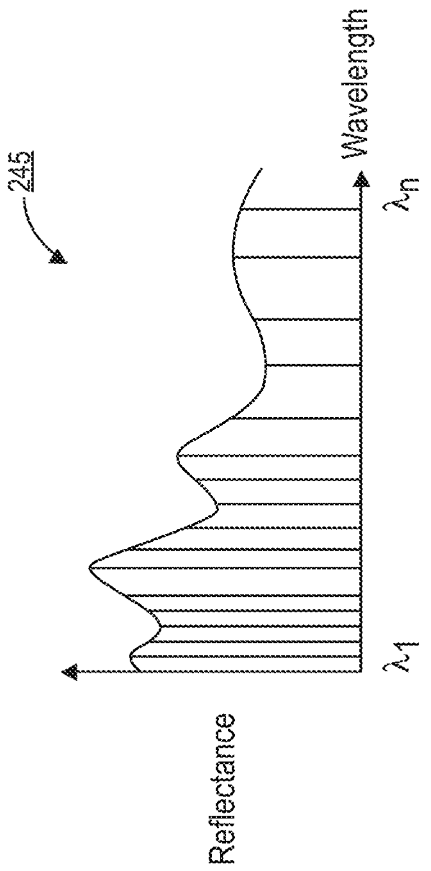
FIG. 2B is a graph of the reflectance value versus the wavelength, in accordance with an embodiment.

In an embodiment, the image slices $240_1$-$240_n$ may be monochromatic images that contain spatial information about the region of the substrate within the FOV. The third dimension (provided by the use of a plurality of different wavelengths) can be used to constitute spectra for each spatial pixel. This information can also be depicted graphically by graph 245, as shown in FIG. 2B. For example, a measure of reflectance for each wavelength $\lambda_1$-$\lambda_n$.

Figure 3:
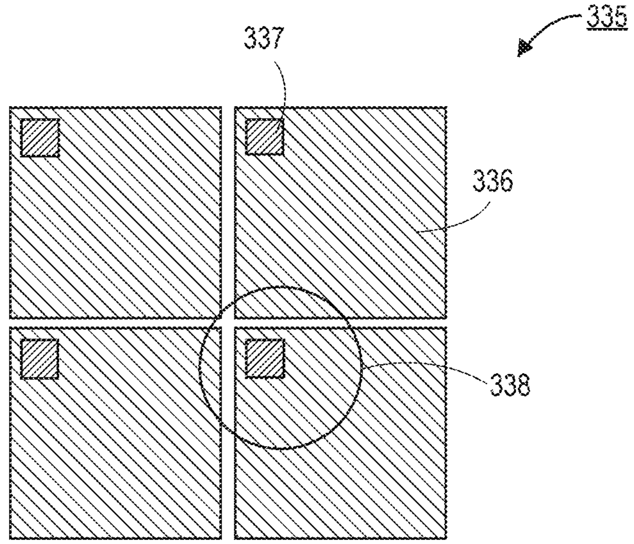
FIG. 3 is a plan view illustration of a portion of a substrate with a plurality of active regions and a plurality of fiducials, in accordance with an embodiment.

Referring now to FIG. 3, a plan view illustration of a portion of a substrate 335 is shown, in accordance with an embodiment. As shown, the substrate 335 may comprise a plurality of device areas 336. The device areas 336 may be dies or the like. In an embodiment, fiducial marks and/or metrology pads 337 are also provided on the substrate 335. The metrology pads 337 in FIG. 3 are shown as being on the device areas 336. Though, in other embodiments, the metrology pads 337 may be in saw streets between device areas 336. In a particular embodiment, the reflective optics of the imaging reflectometry system (not shown) may have a high numerical aperture that enables resolving micrometer or sub-micrometer feature sizes on the substrate. This allows for metrology pads 337 to be reduced in size (e.g., to pad sizes and other dimensions that are less than 25 μm). As such, valuable area on the substrate 335 can be saved for the active device area 336. In an embodiment, a FOV 338 is shown on the substrate 335. The FOV 338 may have a diameter up to approximately 1 mm or approximately 2 mm in some embodiments. The large FOV 338 allows for the precision of the stage movement to be relaxed. Additionally, some embodiments may include continuous scanning and movement of the substrate 335 for enabling quick navigation and inspection capabilities.

Figure 4A:
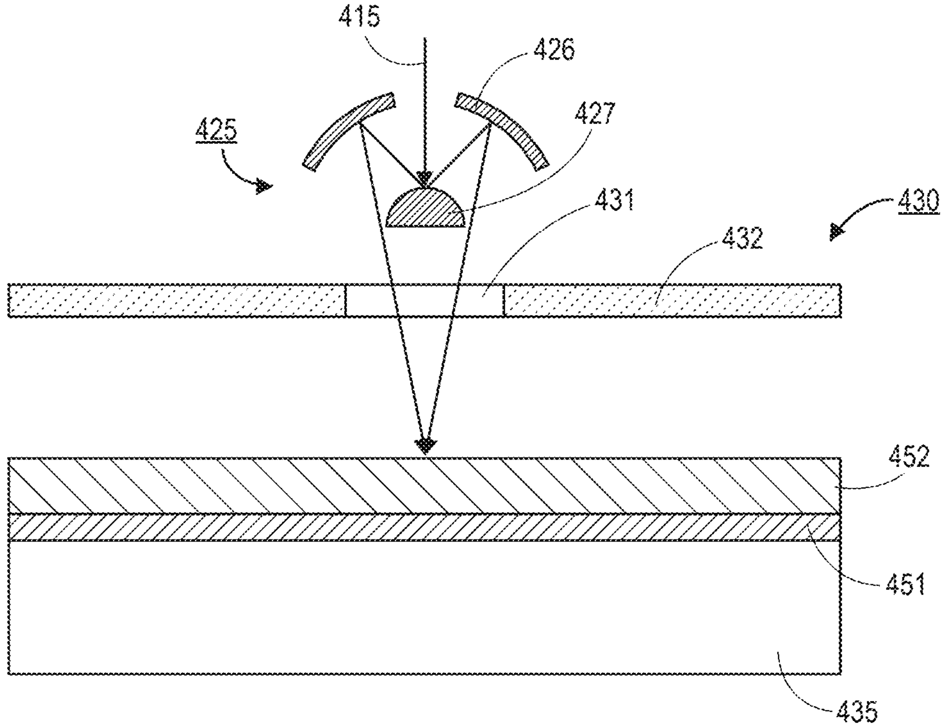
FIG. 4A is a cross-sectional illustration of a portion of a substrate that is being measured by an imaging reflectometer outside of the chamber before a deposition process, in accordance with an embodiment.
Figure 4B:
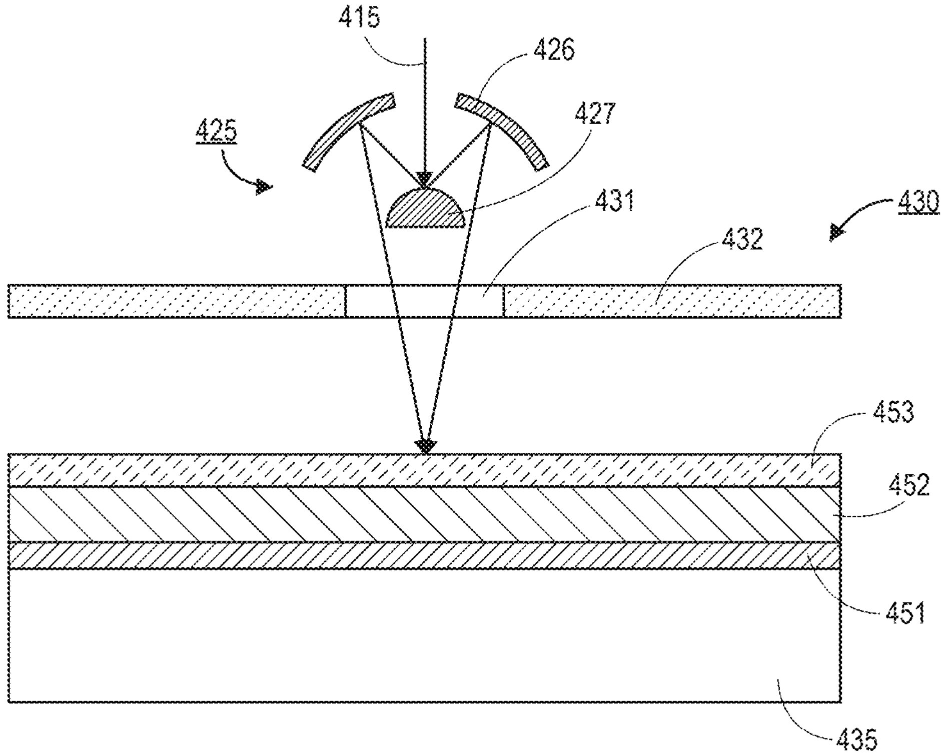
FIG. 4B is a cross-sectional illustration of a portion of a substrate that is being measured by an imaging reflectometer outside of the chamber after a deposition process, in accordance with an embodiment.

Referring now to FIGS. 4A and 4B, a pair of cross-sectional illustrations of a substrate 435 before and after processing is shown, in accordance with an embodiment. FIG. 4A and FIG. 4B depict the substrate 435 within a metrology chamber 430. The metrology chamber 430 may include a lid 432 with an optical window 431 to allow for imaging reflectometry. In FIGS. 4A and 4B, only the reflective objective 425 with a primary mirror 426 and a secondary mirror 427 of the imaging reflectometry system is shown for simplicity. However, it is to be appreciated that the imaging reflectometry system in FIGS. 4A and 4B may be similar to any of the imaging reflectometry systems described in greater detail herein. For example, the imaging reflectometry system may have a light engine (not shown) that sequentially propagates input beams 415 through the optics to reflect off of the substrate 435 back towards an optical sensor (not show), similar to other embodiments described herein.

In FIG. 4A, the substrate 435 is provided in the metrology chamber 430 before a processing operation. This allows for the metrology to provide a "before" analysis of the substrate 435. For example, the substrate 435 may include one or more layers 451 or 452. The layers 451 and/or 452 may have any suitable surface structure, such as including trenches, fins, holes, and/or the like.

In FIG. 4B, the substrate 435 is provided in the metrology chamber 430 after the processing operation. For example, the processing operation may be implemented in a processing chamber that is coupled to the metrology chamber 430 (e.g., similar to the embodiment shown in FIG. 1C). As shown, the processed substrate 435 may include a third layer 453 that has been deposited over the layer 452. The metrology may be used to determine a thickness of the third layer 453, a surface property or surface structure of the third layer 453, and/or any other suitable property that can be determined with imaging reflectometry and/or ellipsometry. In an embodiment, the "before" analysis performed in FIG. 4A can be used as a reference in order to more clearly identify any changes provided by the processing used to form the third layer 453.

Further, since the substrate 435 does not need to leave a vacuum environment, the third layer 453 will not experience and damage and/or degradation. Accordingly, the metrology measurements are a more accurate representation of the actual processing that is done in the processing chamber. Accurate detail of the process can be used as a feedback input that is delivered back to the processing chamber in order to improve future iterations of the processing. For example, a machine-learning and/or artificial intelligence models may utilize feedback metrology data in order to control processing parameters in order to improve process uniformity, yield, throughput, and/or the like.

Figure 5:
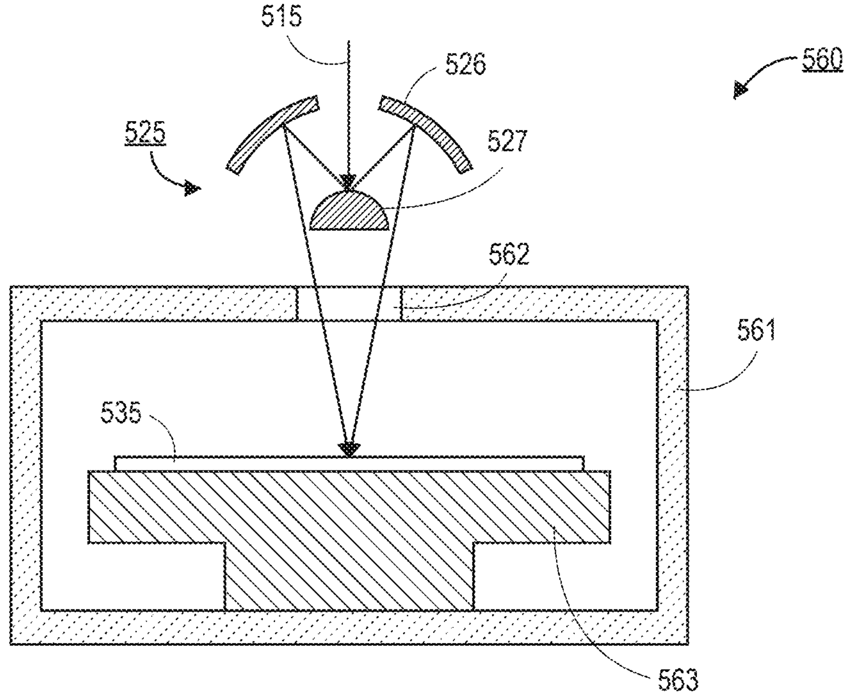
FIG. 5 is a cross-sectional illustration of a semiconductor processing chamber with an integrated imaging reflectometer outside of the chamber for providing endpoint detection, in accordance with an embodiment.

Referring now to FIG. 5, a cross-sectional illustration of a processing chamber 560 is shown, in accordance with an embodiment. In an embodiment, the processing chamber 560 may be any chamber suitable for depositing, etching, and/or treating a layer on a substrate 535 within the chamber. The processing chamber 560 may comprise an optical window 562 within a chamber wall 561 in order to allow for input beams 515 from an imaging reflectometry system to pass through the chamber wall 561 and reflect off of the substrate 535. In FIG. 5, only the reflective objective 525 with a primary mirror 526 and a secondary mirror 527 of the imaging reflectometry system is shown for simplicity. However, it is to be appreciated that the imaging reflectometry system in FIG. 5 may be similar to any of the imaging reflectometry systems described in greater detail herein. For example, the imaging reflectometry system may have a light engine (not shown) that sequentially propagates input beams 515 through the optics to reflect off of the substrate 535 back towards an optical sensor (not show), similar to other embodiments described herein.

In an embodiment, the processing chamber 560 may be set up so that the imaging reflectometry system provides endpoint detection of the given process. For example, when the processing chamber 560 is a deposition chamber, the imaging reflectometry system may be configured to measure a thickness of a layer. When the thickness of the layer reaches a desired value, the deposition process may be stopped. As such, tighter process control of the deposition may be obtained compared to processes that rely on a timed deposition recipe.

Figure 6:
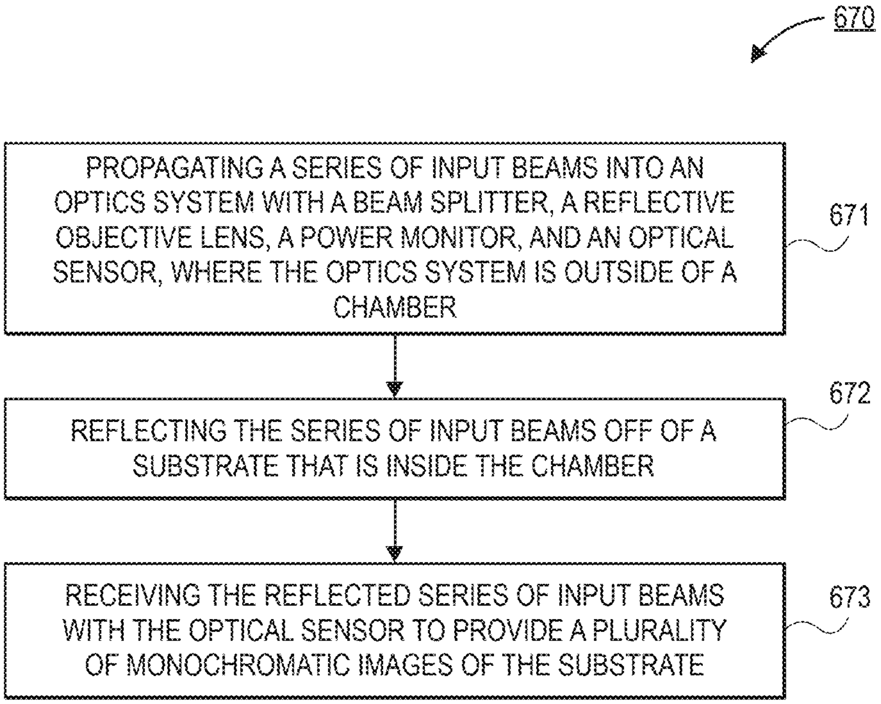
FIG. 6 is a flow diagram of a process for measuring a property of a substrate with an imaging reflectometer, in accordance with an embodiment.

Referring now to FIG. 6, a flow diagram of a process 670 for performing metrology on a substrate within a chamber is shown, in accordance with an embodiment. In an embodiment, the process 670 may begin with operation 671, which comprises propagating a series of input beams into an optics system with a beam splitter, a reflective objective lens, a power monitor, and an optical sensor. In an embodiment, the optics system may be outside of a chamber. In an embodiment, the optics system may be similar to any of the imaging reflectometry systems described in greater detail herein. For example, the reflective objective lens may comprise a Schwarzschild reflective objective lens. In addition to the listed optics components, one or more of a polarizer, a compensator, and/or an analyzer may also be provided in order to implement different metrology processes. One or more of the polarizer, the compensator, and/or the analyzer may also be rotatable.

In an embodiment, the series of input beams may each be generated by a light engine that comprises a plurality of light sources. Each of the light sources may emit an input beam with a different band of wavelengths. For example, each band of wavelengths may be up to approximately 60 nm, up to approximately 100 nm, or up to approximately 200 nm. The input beams may have substantially non-overlapping wavelengths. That is, less than 20% of the band of wavelengths may overlap with another input beam. In an embodiment, the input beams may be sequentially propagated into the optics system at a switching rate between approximately 1 ms and approximately 100 ms. Though, faster or slower switching rates may also be used in some embodiments.

In an embodiment, the process 670 may continue with operation 672, which comprises reflecting the series of input beams off of a substrate that is inside of the chamber. For example, an optics window may be provided through a wall of the chamber in order to allow the input beams to enter the chamber and reflect off of the substrate. The reflected input beams may propagate back into the optics system. In an embodiment, the substrate within the chamber may be placed on a displaceable stage. The stage may be moved in order to bring different portions of the substrate into view of the optics system. In a particular embodiment, the FOV of the optics system may be up to 1 mm or up to 2 mm. Though, larger FOVs may also be possible depending on the design of the optics system.

In an embodiment, the process 670 may continue with operation 673, which comprises receiving the reflected series of input beams with the optical sensor to provide a plurality of monochromatic images of the substrate. In an embodiment, the optical sensor may be coupled with the light engine in order to trigger image captures at the same rate as the switching rate of the input beams. Though, some embodiments may include an optical sensor that captures images at a rate faster than the switching rate of the input beams in order to provide more images for each input beam. This may allow for noise reduction.

In an embodiment, the process 670 may sometimes be referred to as being a reflectometry measurement, an ellipsometry measurement, and/or the like, depending on how the different components of the optics system are configured and or their operational state. For example, rotating one or more of the polarizer, the compensator, and/or the analyzer may allow for ellipsometry measurements.

Figure 7:
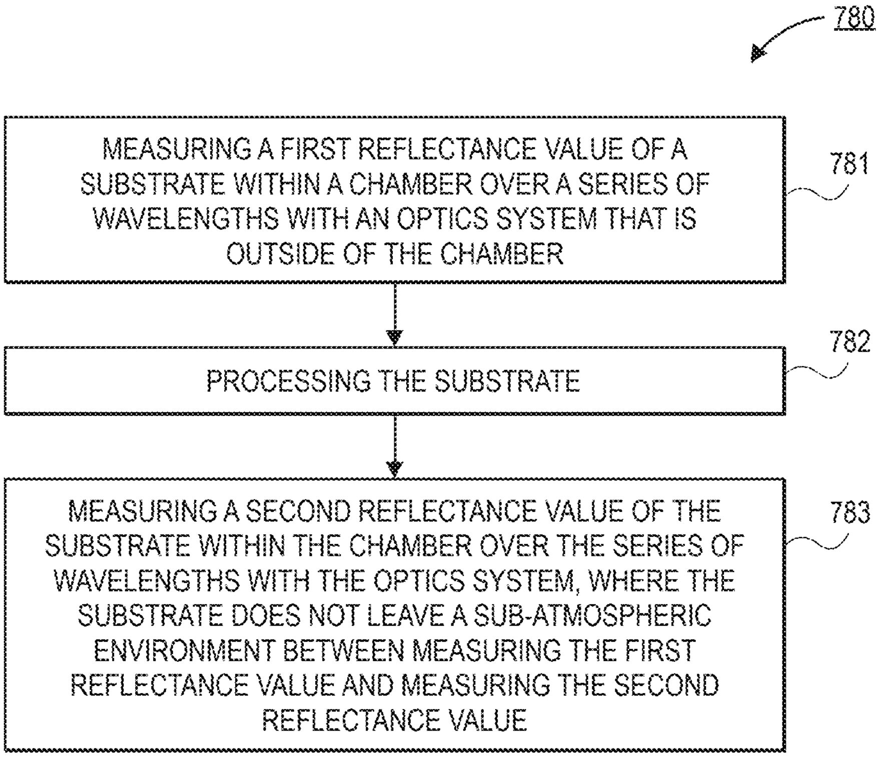
FIG. 7 is a flow diagram of a process for measuring a first reflectance value of a substrate before processing and a second reflectance value of the substrate after processing with an imaging reflectometer, in accordance with an embodiment.

Referring now to FIG. 7, a flow diagram of process 780 for implementing metrology on a substrate before and after a processing operation (e.g., a deposition process, an etching process, a treatment process, and/or the like) is shown, in accordance with an embodiment. In an embodiment, the process 780 may begin with operation 781, which comprises measuring a first reflectance value of a substrate within a chamber over a series of wavelengths with an optics system that is outside of the chamber. In an embodiment, the optics system may be similar to any of the imaging reflectometry systems described in greater detail herein. Additionally, the measurement of the first reflectance value may be made with a process similar to the process 670 described in greater detail herein. In an embodiment, the chamber may have an optics window to allow for the input beams with the series of wavelengths to pass into the chamber from the optics system that is outside of the chamber.

In an embodiment, the process 780 may continue with operation 782, which comprises processing the substrate. In an embodiment, the substrate may be processed in a processing chamber that is coupled to the chamber where operation 781 was implemented. That is, the substrate may enter the processing chamber without leaving a vacuum environment. The processing may include a deposition process, an etching process, a treatment process (e.g., a plasma treatment, a thermal treatment, etc.), or the like.

In an embodiment, the process 780 may continue with operation 783, which comprises measuring a second reflectance value of the substrate within the chamber over the series of wavelengths with the optics system. In an embodiment, the substrate does no leave a sub-atmospheric environment (e.g., a vacuum environment) between measuring the first reflectance value and measuring the second reflectance value. In an embodiment, the measurement of the second reflectance value may be implemented with a process similar to the process 670 described in greater detail herein.

In an embodiment, one benefit of providing a first reflectance measurement and a second reflectance measurement is the result of the processing can be made with a direct before and after context. That is, the starting state of the substrate before processing can be known, and the second reflectance value can provide a direct measure of the effect of the processing. Further, since the substrate does not leave a sub-atmospheric environment between the first reflectance measurement and the second reflectance measurement, there are no effects of damage and/or degradation to the properties of the substrate that need to be accounted for.

Figure 8:
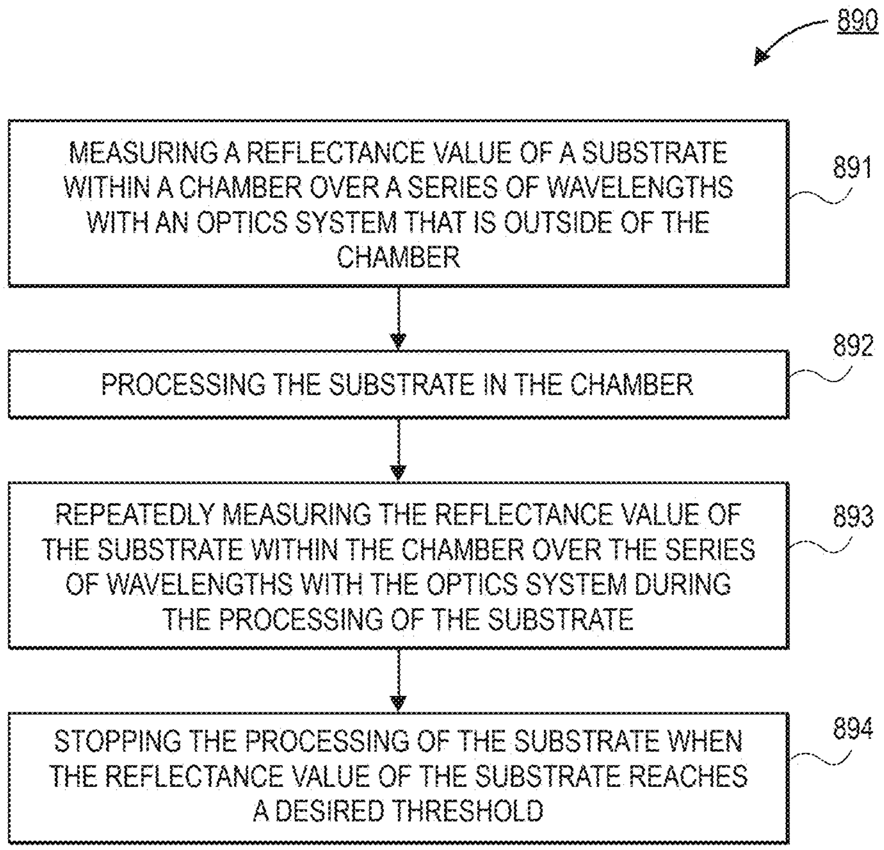
FIG. 8 is a flow diagram of a process for performing endpoint detection in a processing chamber with an imaging reflectometer that is outside of the processing chamber, in accordance with an embodiment.

Referring now to FIG. 8, a flow diagram of a process 890 for providing endpoint detection of a processing operation on a substrate is shown, in accordance with an embodiment. In an embodiment, the process 890 may begin with operation 891, which comprises measuring a reflectance value of a substrate within a chamber over a series of wavelengths with an optics system that is outside of the chamber. In an embodiment, the optics system may be similar to any of the imaging reflectometry systems described in greater detail herein. Additionally, the measurement of the reflectance value may be made with a process similar to the process 670 described in greater detail herein. In an embodiment, the chamber may have an optics window to allow for the input beams with the series of wavelengths to pass into the chamber from the optics system that is outside of the chamber.

In an embodiment, the process 890 may continue with operation 892, which comprises processing the substrate in the chamber. In an embodiment, the substrate processing may include a deposition process, an etching process, a treatment process (e.g., a plasma treatment, a thermal treatment, etc.), or the like.

In an embodiment, the process 890 may continue with operation 893, which comprises repeatedly measuring the reflectance value of the substrate within the chamber over the series of wavelengths with the optics system during the processing of the substrate. In an embodiment, the repeated reflectance value measurements may be made with a process similar to the process 670 describe in greater detail herein.

In an embodiment, the process 890 may continue with operation 894, which comprises stopping the processing of the substrate when the reflectance value of the substrate reaches a desired threshold. For example, when the reflectance value indicates a deposited layer has reached a desired thickness, the process 890 may be halted. As such, an endpoint detection solution is used to provide improved accuracy of the process, compared to using a timed deposition process.

In an embodiment, the data obtained from one or more of the imaging processes 670, 780, and/or 890 may be fed into a machine-learning (ML) and/or artificial intelligence (AI) module for use in improving substrate processing uniformity, throughput, and/or the like. For example, the images obtained may be processed by an computer imaging system that can pull out data from one or more pixels within the FOV. This data can be manipulated by the ML and/or AI module for use in improving processing recipes. For example, one or more processing parameters (e.g., times, temperatures, plasma conditions, gas flows, and/or the like) may be modified in order to improve one or more process outcomes. The large FOV, the ease of navigation to different points on the substrate, and the like can be used to inform feedback and/or feedforward information that can be provided to a computing system that operates one or more tools used to process the substrates. Additionally, an ML and/or AI module may be used to learn the most relevant features and wavelengths within a spectral image provided by the system. In such an embodiment, the ML and/or AI module may be trained to draw connections between spectral image data an any other process parameters, such as, for example, yield, electrical test data, and/or any external metrology data.

Figure 9:
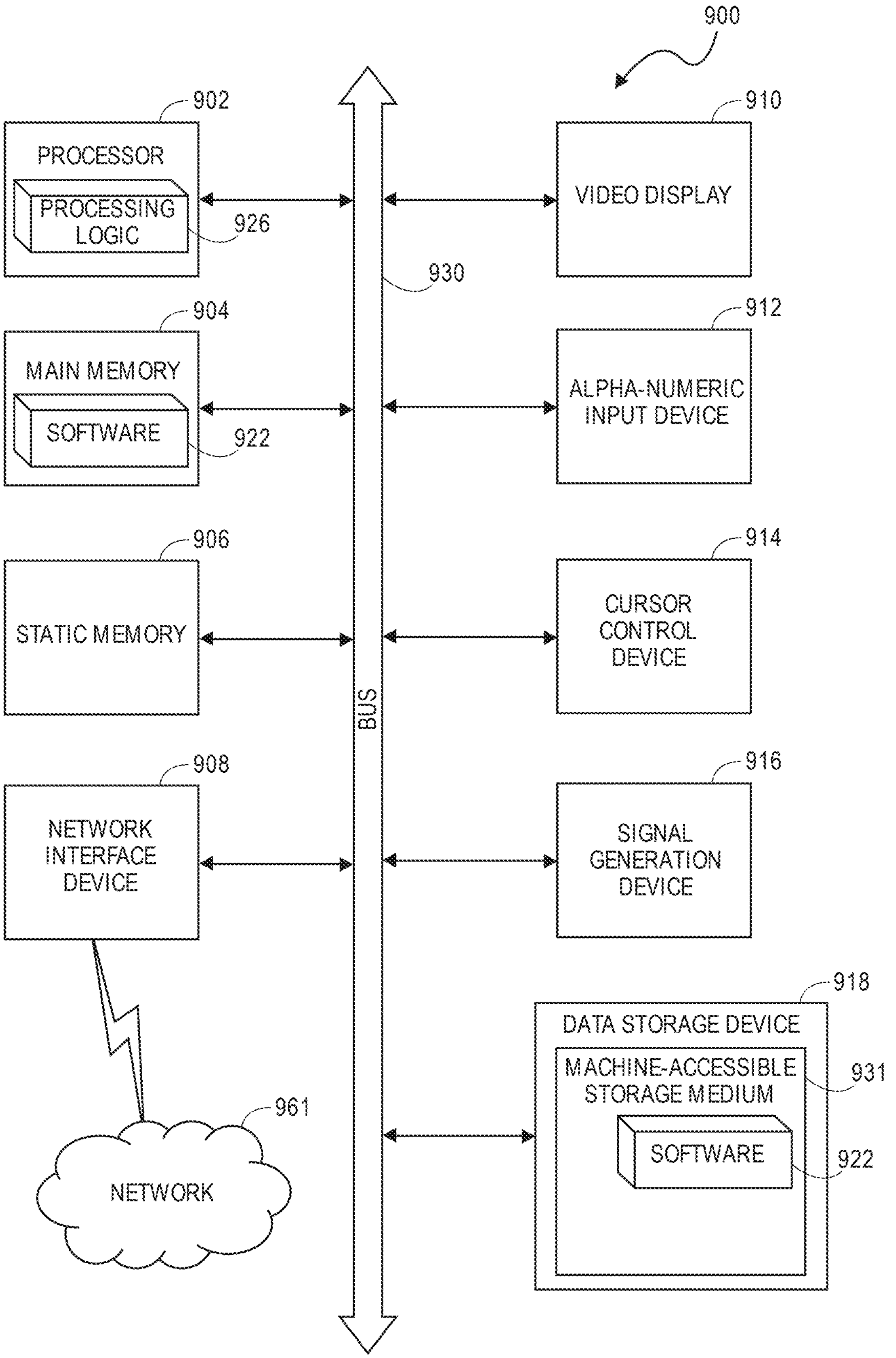
FIG. 9 illustrates a block diagram of an exemplary computer system of a processing tool, in accordance with an embodiment of the present disclosure.

Referring now to FIG. 9, a block diagram of an exemplary computer system 900 of a processing tool is illustrated in accordance with an embodiment. In an embodiment, computer system 900 is coupled to and controls processing of the imaging reflectometry system and/or processing chambers. The computer system 900 may utilize outputs from the imaging reflectometry system in order to modify one or more parameters, such as, for example, processing recipe parameters, of a processing chamber.

Computer system 900 may be connected (e.g., networked) to other machines in a Local Area Network (LAN), an intranet, an extranet, or the Internet. Computer system 900 may operate in the capacity of a server or a client machine in a client-server network environment, or as a peer machine in a peer-to-peer (or distributed) network environment. Computer system 900 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated for computer system 900, the term "machine" shall also be taken to include any collection of machines (e.g., computers) that individually or jointly execute a set (or multiple sets) of instructions to perform any one or more of the methodologies described herein.

Computer system 900 may include a computer program product, or software 922, having a non-transitory machine-readable medium having stored thereon instructions, which may be used to program computer system 900 (or other electronic devices) to perform a process according to embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

In an embodiment, computer system 900 includes a system processor 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 930.

System processor 902 represents one or more general-purpose processing devices such as a microsystem processor, central processing unit, or the like. More particularly, the system processor may be a complex instruction set computing (CISC) microsystem processor, reduced instruction set computing (RISC) microsystem processor, very long instruction word (VLIW) microsystem processor, a system processor implementing other instruction sets, or system processors implementing a combination of instruction sets. System processor 902 may also be one or more special-purpose processing devices such as an application specific integrated circuit (ASIC), a field programmable gate array (FPGA), a digital signal system processor (DSP), network system processor, or the like. System processor 902 is configured to execute the processing logic 926 for performing the operations described herein.

The computer system 900 may further include a system network interface device 908 for communicating with other devices or machines. The computer system 900 may also include a video display unit 910 (e.g., a liquid crystal display (LCD), a light emitting diode display (LED), or a cathode ray tube (CRT)), an alphanumeric input device 912 (e.g., a keyboard), a cursor control device 914 (e.g., a mouse), and a signal generation device 916 (e.g., a speaker).

The secondary memory 918 may include a machine-accessible storage medium 931 (or more specifically a computer-readable storage medium) on which is stored one or more sets of instructions (e.g., software 922) embodying any one or more of the methodologies or functions described herein. The software 922 may also reside, completely or at least partially, within the main memory 904 and/or within the system processor 902 during execution thereof by the computer system 900, the main memory 904 and the system processor 902 also constituting machine-readable storage media. The software 922 may further be transmitted or received over a network 961 via the system network interface device 908. In an embodiment, the network interface device 908 may operate using RF coupling, optical coupling, acoustic coupling, or inductive coupling.

While the machine-accessible storage medium 931 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies. The term "machine-readable storage medium" shall accordingly be taken to include, but not be limited to, solid-state memories, and optical and magnetic media.

Thus, embodiments of the present disclosure include imaging reflectometry systems for performing in-line metrology.

The above description of illustrated implementations of embodiments of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

These modifications may be made to the disclosure in light of the above detailed description. The terms used in the following claims should not be construed to limit the disclosure to the specific implementations disclosed in the specification and the claims. Rather, the scope of the disclosure is to be determined entirely by the following claims, which are to be construed in accordance with established doctrines of claim interpretation.

What is claimed is:

1. An apparatus, comprising:

a light engine, wherein the light engine comprises a plurality of light sources, wherein each of the plurality of light sources is configured to emit a spectral bands with different wavelength bandwidth;

a beam splitter optically coupled to the light engine, wherein the beam splitter splits the spectral bands into a first optical path and a second optical path;

a power monitor optically coupled to the beam splitter along the first optical path;

a reflective objective lens optically coupled to the beam splitter along the second optical path, wherein the reflective objective lens comprises a first mirror and a second mirror;

an optical sensor configured to measure the spectral bands after the spectral bands have reflected off of a substrate; and a compensator between the beam splitter and the reflective objective lens.

2. The apparatus of claim 1, wherein the reflective objective lens is a Schwarzschild reflective objective lens.

3. The apparatus of claim 1, further comprising:

a polarizer between the light engine and the beam splitter.

4. The apparatus of claim 1, wherein the compensator is a quarter wave-plate.

5. The apparatus of claim 1, wherein the compensator is rotatable.

6. The apparatus of claim 1, further comprising:

an analyzer between the reflective objective lens and the optical sensor.

7. The apparatus of claim 6, wherein the analyzer is rotatable.

8. The apparatus of claim 1, wherein the plurality of spectral bands have wavelength bandwidths up to 60 nm.

9. The apparatus of claim 1, wherein the light engine emits the plurality of spectral bands sequentially.

10. The apparatus of claim 1, wherein a field of view (FOV) up to 2 mm on a side is captured from the substrate.

11. An apparatus, comprising:

a chamber, wherein a wall of the chamber comprises a window;

a stage within the chamber; and an imaging reflectometer outside of the chamber, wherein the imaging reflectometer comprises:

a light engine with a plurality of light sources, wherein each light source emits a spectral band with a different wavelength bandwidth;

a reflective objective lens optically coupled to the light engine and positioned over the window, wherein the reflective objective lens reflects the spectral bands through the window towards the stage; and an optical sensor that is optically coupled to the reflective objective lens, wherein a distance between the reflective objective lens and the stage is up to 24 mm, and wherein the window has a thickness that is up to 1 cm.

12. The apparatus of claim 11, wherein the reflective objective lens is a Schwarzschild reflective objective lens.

13. The apparatus of claim 11, wherein the light engine emits the spectral bands sequentially, and wherein two or more of the spectral bands have a different power.

14. The apparatus of claim 13, wherein an image capture of the optical sensor is configured to be synchronized with the sequentially emitted spectral bands.

15. The apparatus of claim 11, wherein the stage is displaceable in a plane parallel to a surface of the window, wherein the imaging reflectometer is displaceable, or both the stage and the imaging reflectometer are displaceable.

16. An apparatus, comprising:

a light engine, wherein the light engine comprises a plurality of light sources, wherein each of the plurality of light sources is configured to emit a spectral bands with different wavelength bandwidth;

a beam splitter optically coupled to the light engine, wherein the beam splitter splits the spectral bands into a first optical path and a second optical path;

a power monitor optically coupled to the beam splitter along the first optical path;

a reflective objective lens optically coupled to the beam splitter along the second optical path, wherein the reflective objective lens comprises a first mirror and a second mirror;

an optical sensor configured to measure the spectral bands after the spectral bands have reflected off of a substrate; and a polarizer between the light engine and the beam splitter.

17. An apparatus, comprising:

a light engine, wherein the light engine comprises a plurality of light sources, wherein each of the plurality of light sources is configured to emit a spectral bands with different wavelength bandwidth;

a beam splitter optically coupled to the light engine, wherein the beam splitter splits the spectral bands into a first optical path and a second optical path;

a power monitor optically coupled to the beam splitter along the first optical path;

a reflective objective lens optically coupled to the beam splitter along the second optical path, wherein the reflective objective lens comprises a first mirror and a second mirror;

an optical sensor configured to measure the spectral bands after the spectral bands have reflected off of a substrate; and an analyzer between the reflective objective lens and the optical sensor, wherein the analyzer is rotatable.

* * * * *